United States Patent [19]

Swars

[11] Patent Number: 5,144,796
[45] Date of Patent: Sep. 8, 1992

[54] BYPASSABLE CATALYTIC CONVERTER, IN PARTICULAR STARTING CATALYTIC CONVERTER THAT CAN BE CIRCUMVENTED

[75] Inventor: Helmut Swars, Bergisch-Gladbach, Fed. Rep. of Germany

[73] Assignee: Emitec Gesellschaft für Emissionstechnologie mbH, Lohmar, Fed. Rep. of Germany

[21] Appl. No.: 661,491

[22] Filed: Feb. 26, 1991

[30] Foreign Application Priority Data

Aug. 26, 1988 [DE] Fed. Rep. of Germany ... 8810816[U]

[51] Int. Cl.⁵ ............................................. F01N 3/28
[52] U.S. Cl. ...................................... 60/288; 422/180
[58] Field of Search ..................... 60/274, 277, 288; 422/176, 180

[56] References Cited

U.S. PATENT DOCUMENTS

| 3,201,206 | 8/1965 | Wawrziniok | 60/288 |
| 3,297,400 | 1/1967 | Eastwood | 60/288 |

FOREIGN PATENT DOCUMENTS

| 3436274 | 4/1986 | Fed. Rep. of Germany | 60/288 |
| 145414 | 7/1985 | Japan | 60/288 |
| 12015 | 1/1989 | Japan | 60/288 |

Primary Examiner—Douglas Hart
Attorney, Agent, or Firm—Herbert L. Lerner; Laurence A. Greenberg

[57] ABSTRACT

A catalytic converter assembly for a motor vehicle having an internal combustion engine includes a housing being penetratable by exhaust gas and having at least one inlet, at least one outlet and a given cross-sectional area. A catalytic converter, especially a starting catalytic converter, is disposed in the housing and fills a portion of the given cross-sectional area defining a bypass route remaining free for the exhaust gas traveling past the catalytic converter. At least one flow baffle is disposed in the housing in the form of a flap being adjustable under the influence of temperature. The flap occupies a first position directing the exhaust gas through the catalytic converter at relatively low temperatures. The flap occupies a second position forming a partition between the catalytic converter and the bypass route in at least in some regions for directing the exhaust gas through the bypass route at relatively high temperatures.

11 Claims, 2 Drawing Sheets

BYPASSABLE CATALYTIC CONVERTER, IN PARTICULAR STARTING CATALYTIC CONVERTER THAT CAN BE CIRCUMVENTED

The invention relates to a catalytic converter being disposed in a housing through which exhaust gas can flow, and having a bypass route in the housing for the exhaust gas.

Such a catalytic converter, which can experience a flow of exhaust gas therethrough or can be bypassed selectively by means of flow baffles, is known from German Published, Non-Prosecuted Application DE 33 28 205 A1. A manual switchover is provided in that publication, for instance if a fuel which is unsuitable for the catalytic converter is used.

It is also known from various publications that the flow path of an exhaust gas can be varied as a function of the temperature by baffles, and in particular in connection with the response behavior of catalytic converters in the cold-starting phase of a motor vehicle. Such a procedure and an appropriate structure therefor are described, for instance, in German Published, Non-Prosecuted Applications DE-OS 20 40 584, DE-OS 22 47 947 and DE 36 29 945 A1, as well as in U.S. Pat. No. 3,972,685.

The known types of structures require relatively complicated housings and necessitate complicated actuating devices for flow baffles.

It is accordingly an object of the invention to provide a bypassable catalytic converter in a housing, in particular a starting catalytic converter that can be circumvented, which overcomes the hereinafore-mentioned disadvantages of the heretofore-known devices of this general type, that is compact and simple in structure, particularly for installation near the engine, and in which the exhaust gas can flow through the catalytic converter at low temperature whereas the catalytic converter can be bypassed at high temperature. The device should be operable without providing branching lines and complicated actuating mechanisms for the flow baffle.

With the foregoing and other objects in view there is provided, in accordance with the invention, a catalytic converter assembly for a motor vehicle having an internal combustion engine, comprising a housing being penetrable by exhaust gas and having at least one inlet, at least one outlet and a given cross-sectional area, a catalytic converter, in particular a starting catalytic converter, disposed in the housing and filling a portion of the given cross-sectional area defining a bypass route remaining free for the exhaust gas traveling past the catalytic converter, and at least one flow baffle in the housing in the form of a flap, in particular a bimetallic flap, being adjustable under the influence of temperature, the flap occupying a first position directing the exhaust gas through the catalytic converter at relatively low temperatures, and the flap occupying a second position forming a partition between the catalytic converter and the bypass route in at least in some regions for directing the exhaust gas through the bypass route at relatively high temperatures, for instance above 700° to 900° C.

The effect of the configuration of the flow baffle according to the invention is that beyond a certain operating temperature which may, for instance, be on the order of 700° C. or higher, the catalytic converter no longer experiences the direct flow of exhaust gas against it and through it but instead the exhaust gas is carried through the bypass route. This protects a catalytic converter installed near the engine especially from overheating, and the flaps acting as a partition serve not only for guiding the flow but also for thermally shielding the catalytic converter from the hot exhaust gas. In the cold state, the flap assumes a position causing practically all of the exhaust gas to be passed through the catalytic converter. As a result, the catalytic converter reaches operating temperature very quickly and begins to perform catalytic conversion. Consequently, harmful exhaust gases can be greatly reduced even in the cold-starting phase, and moreover a main catalytic converter connected to its output side starts up faster. As soon as the main catalytic converter is in operation and the engine is emitting exhaust gases at high temperature, the preceding catalytic converter is not only no longer needed but may even be damaged by excess temperatures. This is prevented by the flap, since with increasing temperature it opens up more and more of the cross-sectional area of the bypass route and finally shuts off the catalytic converter completely. This can be achieved in a particularly simple manner by means of a bimetallic flap, but other actuating means that function automatically under the influence of temperature, in combination with a flap fastened in an articulated or flexible manner, are also possible.

In accordance with another feature of the invention, the catalytic converter has a jacket tube to which the flap is fastened.

It has proved to be advantageous, in the case of metal catalytic converters having a jacket tube, to secure the flap directly to the jacket tube, preferably by welding. Metal catalyst carrier bodies of this kind are described, for instance, in European Patent No. 0 136 515 B1; and Published European Application Nos. 0 159 468 A2; 0 220 468 A1 corresponding to U.S. Pat. No. 4,818,746; 0 245 737 A1 corresponding to U.S. Pat. Nos. 4,923,109 and 4,832,998; and 0 245 738 A1 corresponding to U.S. Pat. Nos. 4,803,189 and 4,946,822. In the case of the application of the device according to the invention, shapes having a non-round cross section are particularly suitable, because with them the desired configuration of the catalytic converter and the bypass route in a housing is most easily achieved.

Since even small partial flows of exhaust gas still flowing through the catalytic converter despite the fully opened bypass route can cause it to overheat, it is particularly important to divert the flow as completely as possible. Therefore, in accordance with a further feature of the invention, the housing has shaped portions in the vicinity of the at least one inlet, the flap moves through a given temperature-dictated adjustment path between the first and second positions, and the flap has a length permitting the flap to be disposed downstream of or to undercut a respective of the shaped portions, especially in the second position at the relatively high temperatures. Bulges or recesses on the housing that can be undercut by the flap in its terminal positions can be very helpful in this case. This is true particularly for a suitable shaping of the housing and flap in the vicinity of the terminal position at high temperature.

The remaining remnant flow of exhaust gas through the catalytic converter may optionally be reduced even further by blocking off not only the upstream side of the catalytic converter but also its downstream side, from the bypass route by means of a flap.

In accordance with an additional feature of the invention, the exhaust gas flows in a given direction in the housing, and the flap acts bidirectionally at upstream and downstream locations as seen in the given direction for blocking off the catalytic converter from the bypass route at the relatively high temperatures.

In accordance with yet another feature of the invention, the exhaust gas flows in a given direction in the housing, and the flap includes two partial flaps acting at respective upstream and downstream locations as seen in the given direction for blocking off the catalytic converter from the bypass route at the relatively high temperatures.

It is therefore seen that the upstream and downstream blocking can be attained either by means of a second flap, or by a flap extending in both directions and being fastened approximately in its center. In any case, the decisive factor is the shielding of the leading end of the catalytic converter, which is most easily attained by means of a flap oriented counter to the flow. Therefore, in accordance with an added feature of the invention, the exhaust gas flows in a given direction in the housing, and the flap has a retaining location and protrudes from the retaining location counter to the given direction.

In accordance with a concomitant feature of the invention, there are provided means for permitting removal of the catalytic converter and the flap together from the housing.

It will be described in further detail in conjunction with the drawing, that it may be advantageous to secure a catalytic converter with a flap fastened onto it in such a way as to be removable from a housing, preferably a cast housing. However, this is merely a variant embodiment, since completely welded housings with catalytic converters secured therein on one end also have advantages from a manufacturing standpoint.

Other features which are considered as characteristic for the invention are set forth in the appended claims.

Although the invention is illustrated and described herein as embodied in a bypassable catalytic converter, in particular a starting catalytic converter that can be circumvented or disengaged, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
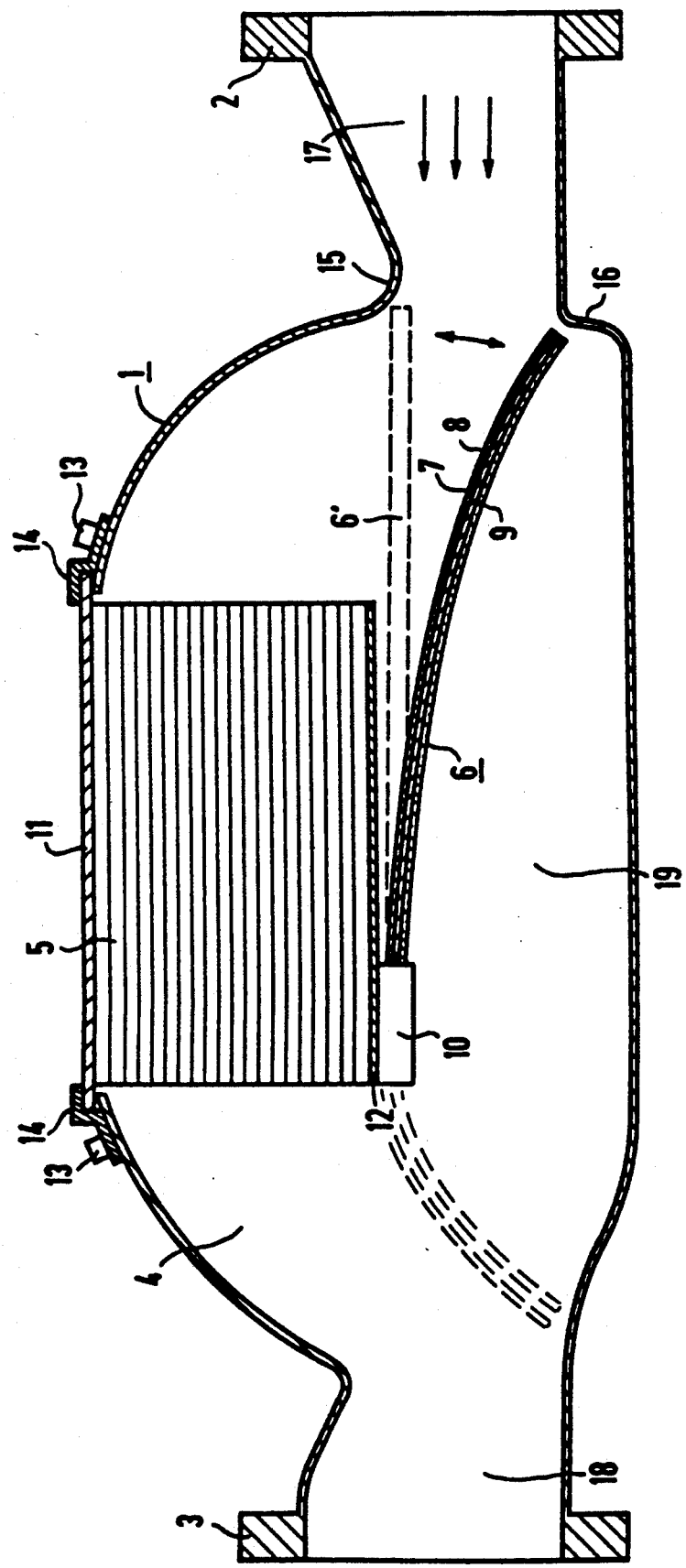
FIG. 1 is a diagrammatic, longitudinal-sectional view of a configuration according to the invention having a catalytic converter that can be bypassed as a function of temperature.

Referring now to the figures of the drawing in detail, there is seen a bellied or bulging housing 1 with an inlet 17, an outlet 18 and flanges 2, 3 at both ends. An unobstructed cross section 4 in the bellied region of the housing is only partly filled by a catalytic converter or catalyst carrier body 5, while the remaining cross section is available as a bypass route 19. The catalytic converter 5 is secured to a retaining plate 11 and has a jacket tube 12. The upper region of the housing 1 has an opening formed therein corresponding to the shape of the catalytic converter 5 and being closed by a lid. The retaining plate 11 is fixed relative to the housing 1 by fastening means 13, 14. A bimetallic flap 6 is secured to the jacket tube 12 of the catalytic converter 5 by a retainer 10. The bimetallic flap includes at least two metal layers 7, 8 having different coefficients of thermal expansion, and is optionally also provided with a thermal insulator 9. The bimetallic flap 6 is in the illustrated first position when cold or at relatively low temperatures, so that it can deflect oncoming exhaust gas, which is represented by arrows, toward the catalytic converter in cooperation with a shaped portion in the form of a bulge 16 of the housing 1. Therefore, in the cold state, the catalytic converter 5 has the majority of the exhaust gas flowing through it. However, if the bimetallic flap 6 warms up at relatively high temperatures, then it moves into a second position 6' shown in broken lines, as indicated by another arrow. The catalytic converter 5 in cooperation with another shaped portion 15 at the inlet end of the housing is thus maximally shielded from hot exhaust gas, which then flows through the bypass route 19. The flap 6 has a length permitting the flap to be disposed downstream of or undercutting a respective one of the shaped portions 15, 16 in each of said first and second positions.

The opening provides means for permitting removal of the catalytic converter 5 and the flap 6 together from the housing 1. Therefore, the catalytic converter 5 along with the bimetallic flap 6 is easily replaceable or exchangeable.

Figure 2:
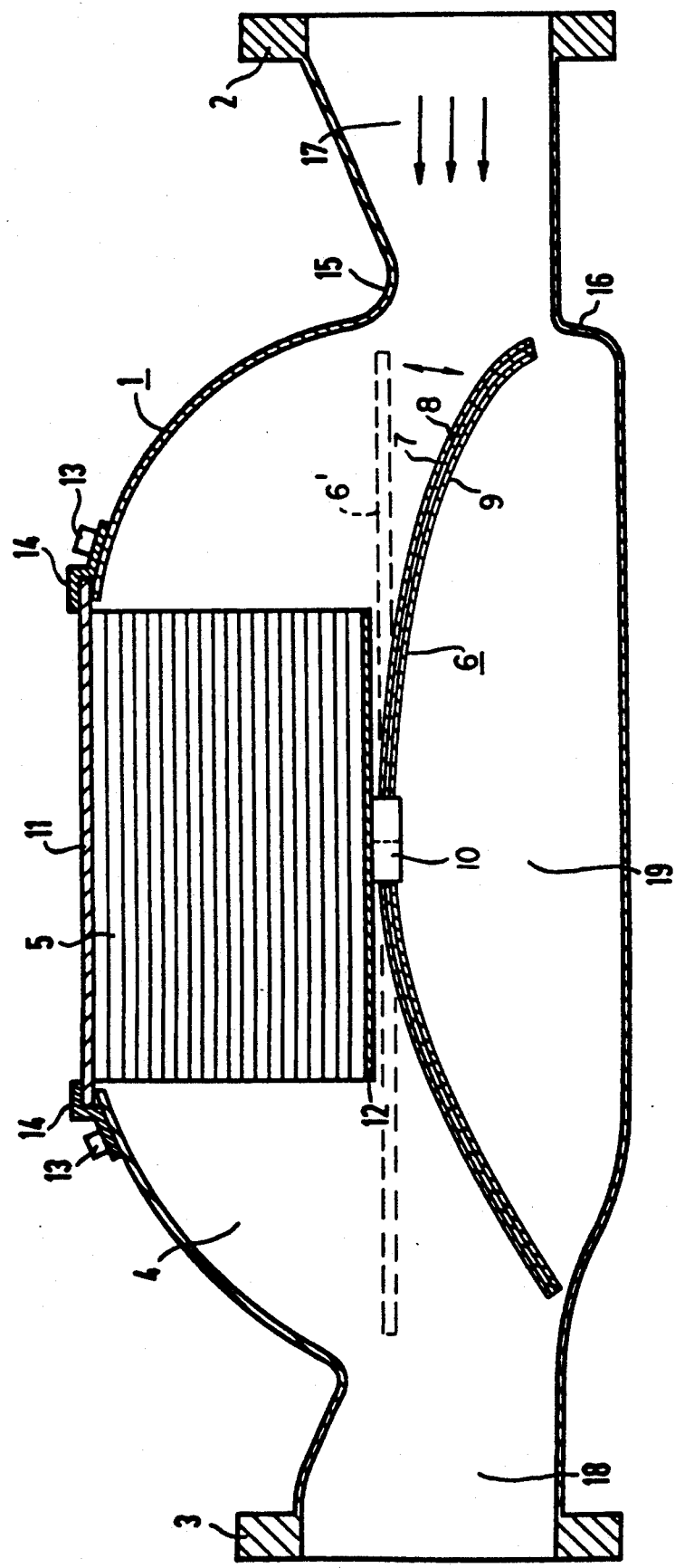
FIG. 2 is a view similar to that of FIG. 1, with a bidirectional flap or two-part flap in place.

According to another embodiment of the invention, as shown in FIG. 2, the retainer 10 may be in the middle of the flap, so that the flap 6 may act bidirectionally at an upstream location in the vicinity of the inlet 17 and a downstream location in the vicinity of the outlet 18, as seen in an exhaust gas flow direction in the housing, in order to block off the catalytic converter 5 from the bypass route 19 at relatively high temperatures.

According to a further embodiment of the invention, the flap 6 may include two partial flaps being held by the retainer 10 for acting at the respective upstream and downstream locations in order to block off said catalytic converter 5 from said bypass route 19 at the relatively high temperatures. This further embodiment is indicated by the broken line in FIG. 2 through the retainer 10.

Configurations according to the invention are particularly well suited for precatalytic converters installed near the engine.

I claim:

1. A catalytic converter assembly for a motor vehicle having an internal combustion engine, comprising a housing being penetrable by exhaust gas and having at least one inlet, at least one outlet and a given cross-sectional area, a catalytic converter disposed in said housing and filling a portion of said given cross-sectional area defining a bypass space remaining free for the exhaust gas traveling past said catalytic converter, and at least one flow baffle in said housing in the form of a bimetallic flap being adjustable under the influence of temperature, said flap occupying a first position directing the exhaust gas through said catalytic converter at relatively low temperatures, and said flap occupying a second position forming a partition wall between said catalytic converter and said bypass space in at least some regions for directing the exhaust gas through said bypass space at relatively high temperatures and for shielding said catalytic converter from the exhaust gas.

2. The catalytic converter according to claim 1, wherein said relatively high temperatures are above 700° to 900° C.

3. The catalytic converter according to claim 1, wherein said catalytic converter has jacket tube to which said flap is fastened.

4. The catalytic converter according to claim 1, wherein said housing has shaped portions in the vicinity of said at least one inlet, said flap moves through a given temperature-dictated adjustment path between said first and second positions, and said flap has a length permitting said flap to be disposed downstream of a respective one of said shaped portions in each of said first and second positions.

5. The catalytic converter according to claim 1, wherein said housing has shaped portions in the vicinity of said at least one inlet, said flap moves through a given temperature-dictated adjustment path between said first and second positions, and said flap has a length permitting said flap to be disposed downstream of one of said shaped portions in said second position at the relatively high temperatures.

6. The catalytic converter according to claim 1, wherein the exhaust gas flows in a given direction in said housing, and said flap has a retaining location and protrudes from said retaining location counter to said given direction.

7. The catalytic converter according to claim 1, wherein the exhaust gas flows in a given direction in said housing, and said flap acts bidirectionally at upstream and downstream locations as seen in said given direction for blocking off said catalytic converter from said bypass space at the relatively high temperatures and for completely shielding said catalytic converter from the exhaust gas.

8. The catalytic converter according to claim 1, wherein the exhaust gas flows in a given direction in said housing, and said flap includes two partial flaps acting at respective upstream and downstream locations as seen in said given direction for blocking off said catalytic converter from said bypass space at the relatively high temperatures.

9. The catalytic converter according to claim 3, including means for permitting removal of said catalytic converter and said flap together from said housing.

10. A catalytic converter assembly for a motor vehicle, comprising a housing being penetrable by exhaust gas and having a given cross-sectional area, a catalytic converter disposed in said housing and filling a portion of said given cross-sectional area defining a bypass space remaining free for the exhaust gas traveling past said catalytic converter, and at least one flap in said housing occupying a first position directing the exhaust gas through said catalytic converter at relatively low temperatures and occupying a second position forming a partition wall for at least partially directing the exhaust gas through said bypass space at relatively high temperatures while shielding said catalytic converter from the exhaust gas.

11. A starting catalytic converter assembly for a motor vehicle having an internal combustion engine, comprising a housing being penetrable by exhaust gas and having at least one inlet, at least one outlet and a given cross-sectional area, a catalytic converter disposed in said housing and filling a portion of said given cross-sectional area defining a bypass space remaining free for the exhaust gas traveling past said catalytic converter, and at least one flow baffle in said housing in the form of a flap being adjustable under the influence of temperature, said flap occupying a first position directing the exhaust gas through said catalytic converter at relatively low temperatures, and said flap occupying a second position forming a partition wall between said catalytic converter and said bypass space in at least some regions for directing the exhaust gas through said bypass space at relatively high temperatures and for shielding said catalytic converter from the exhaust gas.

* * * * *